United States Patent [19]

Cochrane

[11] Patent Number: 4,951,830
[45] Date of Patent: Aug. 28, 1990

[54] SNAP-ON CLOSURE WITH CORKING SKIRT

[76] Inventor: Benjamin A. Cochrane, 181 Sonora Ave., Danville, Calif. 95426

[21] Appl. No.: 335,767

[22] Filed: Apr. 10, 1989

Related U.S. Application Data

[63] Continuation-in-part of Ser. No. 947,043, Dec. 29, 1986, Pat. No. 4,819,906, which is a continuation-in-part of Ser. No. 709,534, Mar. 8, 1985, Pat. No. 4,632,265, which is a continuation-in-part of Ser. No. 507,342, Jun. 24, 1983, abandoned.

[51] Int. Cl.$^5$ .................................. B65D 41/48
[52] U.S. Cl. .................................. 215/256; 215/320
[58] Field of Search .............. 215/256, 258, 352, 354, 215/320

[56] References Cited

U.S. PATENT DOCUMENTS

| | | | |
|---|---|---|---|
| 2,942,747 | 6/1960 | Towns | 215/253 |
| 3,112,838 | 12/1963 | Studer | 215/256 |
| 3,142,403 | 7/1964 | Fox | 215/256 |
| 3,186,572 | 6/1968 | McKnight | 215/254 |
| 3,255,907 | 6/1968 | Eddy . | |
| 3,338,446 | 8/1968 | Faulstich | 215/256 X |
| 3,411,650 | 11/1968 | Mumford . | |
| 3,608,765 | 9/1971 | Faulstich | 215/320 X |
| 3,661,289 | 5/1972 | Segmuller | 215/256 |
| 3,812,994 | 5/1974 | Feldman | 215/256 |
| 3,856,171 | 12/1974 | Rossi | 215/256 |
| 3,901,404 | 8/1975 | Feldman | 215/256 |
| 3,927,784 | 12/1975 | Cochrane | 215/258 X |
| 3,974,932 | 8/1976 | Faulstich | 215/256 |
| 3,994,409 | 11/1976 | Nightengale | 215/256 |
| 4,024,976 | 5/1977 | Acton | 215/256 X |
| 4,166,552 | 9/1979 | Faulstich | 215/256 |
| 4,199,071 | 4/1980 | D'Amico | 215/256 |
| 4,281,774 | 8/1981 | Mumford | 215/256 X |
| 4,335,824 | 6/1982 | Bush | 215/256 X |
| 4,346,812 | 8/1982 | Banich | 215/352 |
| 4,387,818 | 6/1983 | Conti | 215/256 |
| 4,438,857 | 3/1984 | Bullock | 215/256 |
| 4,678,094 | 7/1987 | Bullock | 215/256 |

FOREIGN PATENT DOCUMENTS

1137029 12/1982 Canada .
1107541 5/1961 Fed. Rep. of Germany .

*Primary Examiner*—Donald F. Norton
*Attorney, Agent, or Firm*—Plante, Strauss Vanderburgh and Connors

[57] ABSTRACT

There is disclosed a snap-on closure which has upper and lower annular beads on the inside wall of a peripheral skirt with a tear band defined by at least one score line in the skirt, located between the annular beads. The closure has a center corking skirt that is downwardly dependent from its undersurface and this corking skirt has sufficiently thin side walls to flex. The corking skirt is spaced concentrically within the outer peripheral skirt of the closure and is spaced apart from the peripheral skirt by an annulus having a width which is slightly less than the width of the inner lip found on the neck finish of conventional bottles. This ensures that the corking skirt will resiliently engage the inside mouth of the bottle and be deflected thereby, thus forming a seal in the mouth of the bottle. The corking skirt can have reinforcement gussets that project radially inwardly from its side wall and depend from the undersurface of the top disk of the closure. These gussets are also of a thickness sufficiently thin to permit flexing when elastic deformation of the corking skirt is required for fitting of the closure.

13 Claims, 5 Drawing Sheets

SNAP-ON CLOSURE WITH CORKING SKIRT

RELATION TO OTHER APPLICATIONS

This application is a continuation-in-part of my copending application Ser. No. 947,043, filed on Dec. 29, 1986, now U.S. Pat. No. 4,819,906, which is a continuation-in-part of parent application Ser. No. 709,534, filed on Mar. 8, 1985 now U.S. Pat. No. 4,632,265, which is a continuation-in-part of parent application Ser. No. 507,342, filed on June 24, 1983, now abandoned.

BACKGROUND OF INVENTION

1. Field of Invention

This invention relates to a closure for bottles and, in particular, to a snap-on closure.

2. Brief Statement of the Prior Art

Bottle closures are commonly molded of plastic and are of two types. One type is a twist-on closure or screw closure that engages a threaded neck finish and is applied by threading it on the neck of the bottle. The other type of closure is a snap-on closure which has a peripheral skirt which receives the neck of the bottle and one or more annular beads on its inside wall that snap into receiving grooves of the neck finish of the bottle. Typically, at lease two grooves and beads are provided with a tear tab between the two beads and score lines in the skirt to permit severing of the closure into a reclosure lid and a throw away tear band.

The snap-on closures have frequently been provided with a center corking skirt which is intended to seal the mouth of the bottle. The plastic bottles are blow-molded and the neck finish is achieved with dies commonly referred to as shear steel and neck rings. With frequent or prolonged use, the close tolerances of these dies can be lost with the result that the thicknesses of the neck walls can vary significantly from the original specifications. Furthermore, lack of precise control in manufacturing of the closures frequently results in closures in which the tolerances are not carefully controlled. Difficulties are experienced in the capping operations from both of these causes, and are aggravated by the trend to very light-weight plastic dairy containers, such as the 50-gram gallon container. To illustrate, flashing is trimmed from the neck of the containers during their manufacture and, sometimes, this trimming is imperfect so that necks are obtained which are not perfectly in round or in which the flashing is not completely removed. The result of these fabrication errors is that the container neck frequently wedges between the inner and outer skirts of the closure, lifting the closure or preventing the closure from securely seating.

Consequently, the corking skirt has been designed with minimal dimensions to avoid interference with outsized bottle necks that would prevent the closures from seating on the bottles. This, however, requires that the corking skirt be undersized, and results in loss of the sealing capbility of the corking skirt and these closures are notoriously "leakers" in the industry.

Seals of various designs have also been used for the snap-on closures to improve the poor sealing capability of the corking skirt closures. Liners have been ultrasonically and thermally bonded to bottle necks. These seals, however, have only complicated the closure design and increased its manufacturing and application costs.

Manufacturers of press-on closures have also avoided split cavity molds, i.e., molds which split along axially to the plane of the closure, because of their high complexity and cost. Consequently, the tab on the tear band of the closure of one manufacturer is formed on the lower edge of the closure skirts, resulting in a spiral tear band, as in U.S. Pat. No. 3,338,446. Closures of this design, however, are prone to split during the capping operation. Other manufacturers have avoided the splitting problem with entirely annular bear bands having lateral tear tabs, however, this closure does not have an annular lip on its reclosure, and for this reason is inconvenient to the consumer.

In my prior patent, U.S. Pat. No. 4,032,029, I disclosed a closure with an annular tear band and tab, and an annular lip. While this closure was a substantial improvement over the aforementioned closures, its manufacture require a split cavity mold, and it also utilized a less than ideal center corking skirt.

OBJECTIVES OF THE INVENTION

It is an object of this invention to provide an improved snap on closure for a bottle.

It is further object of the invention to provide a snap-on closure with a corking skirt that effectively seals in the mouth of a bottle.

It is a further object of the invention to provide a snap-on closure with a corking skirt that adjusts or accommodates for variations in dimensions of the neck finish of bottles.

It is an additional object of this invention to provide a snap-on closure which can be molded in a manufacturing mold having a single parting surface.

It is an additional object of the invention to provide the aforementioned closure with an annular tear band and radially projecting tear tab.

BRIEF DESCRIPTION OF THE INVENTION

This invention comprises a snap-on closure which has upper and lower annular beads on the inside wall of a peripheral skirt with a tear band defined by at least one score line in the skirt, located between the annular beads. The closure has a center corking skirt that is downwardly dependent from its undersurface and this corking skirt has sufficiently thin side walls to flex. The corking skirt is spaced concentrically within the outer peripheral skirt of the closure and is spaced apart from the peripheral skirt by an annulus having a width which is slightly less than the width of the inner lip found on the neck finish of conventional bottles. This ensures that the corking skirt will resiliently engage the inside mouth of the bottle and be deflected thereby, thus forming a seal in the mouth of the bottle. The corking skirt can have reinforcement gussets that project radially inwardly from its side wall and depend from the undersurface of the top disk of the closure. These gussets are also of a thickness sufficiently thin to permit flexing when elastic deformation of the corking skirt is required for fitting of the closure.

DESCRIPTION OF PREFERRED EMBODIMENTS

When references are made to the accompanying drawings the similar characters of reference represent corresponding parts in each of the several figures.

Figure 1:
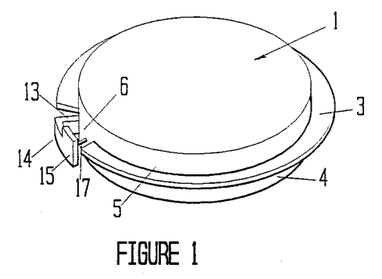
FIG. 1 is a perspective view of the preferred form of the closure of the invention.
Figure 2:
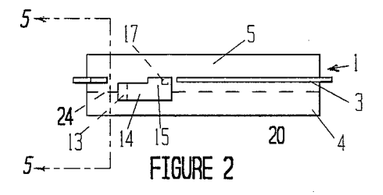
FIGS. 2 and 4 are elevational views of the closure shown in FIG. 1.
Figure 4:
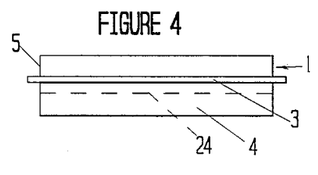

As shown in FIGS. 1, 2 and 4, the closure 1 is constructed in accordance with the present invention from a resilient and moderately flexible plastic substance that will deform slightly to snap on and snap off a container. Exemplary plastic materials which may be employed include polyethylene, polystyrene, polyvinyl chloride, polyacrylates, polyamides, polypropylene, etc. The preferred plastics are polyethylene and polystyrene.

Closure 1 has three major external structural elements; a top disk 2, a single downwardly dependent skirt 4, and a partial annular lip 3 about its upper portion 5. The top disk 2 is preferably a flat circular plate having a substantially planer exterior surface. The flat exterior surface provides a convenient place for labels or instructional material. While the disk can have a shape other than circular such as rectangular, oval, etc., the circular shape is preferred. The annular lip 3 extends outwardly from the skirt a slight distance to provide a convenient grasping tab for the removal of the upper portion 5 (reclosure) of the closure from the container once the tear band, described hereinafter, has been removed. As illustrated, lip 3 is discontinuous in the area 6, immediately above tear tab 14. A greater portion of lip 3 can be omitted, if desired, provided a sufficient area is present to permit one to lift up on the closure with one's fingers or thumb. Thus, the consumer, after removing the tear band from the closure, can open the container by applying pressure upwardly on the lip 3 by a thumb or finger. This section will unseat the upper bead from the upper groove and allow the closure to slide off the container neck in the manner described hereinafter.

The tear tab 14 has a radial leg 13 which is integral with the skirt 4 and also integral with a lateral leg 15. Leg 13 is about the same height as the width of the tear band, i.e., the distance between upper score line 10 and lower score line 24. Preferably, the end of leg 15 is of slightly greater height (see FIG. 2) than leg 13, and extends up to the level of the annular lip 3. Preferably the leg 15 is secured to the skirt 4 by a small, integral leg 17 which extends between the leg 15 and skirt 4.

FIG. 2 shows the lower score line 24 in a hidden object line, as this score line is on the inside wall of the skirt 4. With this embodiment, a complete tear band is removed, leaving a bottom ring on the bottle neck, which is the bottom portion of the closure, below the lower score line 24. This construction is used when the lower edge of the closure is ultrasonically welded or bonded to the bottle, in a completely tamper proof closure.

Figure 5:
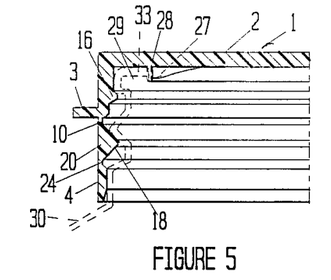
FIG. 5 is an enlarged sectional view along line 5—5' of FIG. 2.

Referring now to FIG. 5, a view is shown along line 5—5' of FIG. 2, with the neck of a bottle shown in broken lines. The skirt 4 of closure 1 is integrally attached to the top disk 2 and extends substantially perpendicularly from the undersurface of the disk. The skirt 4 is a thin-walled cylindrical shell and is composed of the thin shell, an upper score line 10, a lower score line 24, tear tab 14, an upper circumferential bead 16 and a lower circumferential bead 18.

The thickness of the skirt is not critical to the practice of this invention as long as the closure is sufficiently resilient to allow the internal beads 16 and 18 to expand over the wide areas of the container neck and snap into the container grooves without tearing the closure or container. Generally, however, the skirt thickness is governed by economics with the thinnest walled functional closure being preferred. Usually, the skirt will have a thickness ranging from 0.3 to 1.5 millimeters and more usually from 0.5 to 1.2 millimeters.

The upper score line 10 and lower score line 24 are annular grooves in the inside wall of the skirt 4 and extend circumferentially about the skirt 4. Preferably they are triangular shaped grooves, i.e., V-grooves which extend into the skirt approximately 0.15 to 0.5 times the thickness of skirt 4. That portion of the skirt between score lines 10 and 12 constitutes tear band 20. This tear band is removed when the consumer opens the container and, after it is removed from the closure, it can be discarded. Since it is to be discarded, it is preferable to make the band as narrow as possible without weakening the band to a point where it could break during removal. Generally the tear band will range in width from 2 to 10 millimeters. A weakened short vertical groove (not shown) extends axially on the inside wall of skirt 4, from the lower score 24 to the upper score line 10 substantially adjacent to tear tab 14. The weakened groove is provided so that the tear band may be easily separated and torn free form the closure. Preferably, this weakened area is a vertical score line having substantially the same cross section as the score lines 10 and 24.

The lower score line 24 is optional. When it is desired to completely remove the lowermost portion of the closure with the tear tab, the score line 24 is omitted.

The lateral tear tab 14 (see FIGS. 1 and 2) is attached to tear band 20 to provide a means for the user to grasp the tear band and tear it from the closure. The tear tab 14 may be any laterally projecting tab which permits the consumer to easily grasp it. In a preferred embodiment, the tab 14 has a leg 13 which extends laterally outwardly from the tear band 20 and lateral leg 15 which extends circumferentially, parallel to the band 20. The tab 14 is preferably of greater width than the band 20 for ease in grasping the tab and removing the tear band, and projects above the band 20 slightly. In order to increase the friction between the fingers and the tear tab, the tab can be provided with serrated grooves or the like (not shown).

Figure 3:
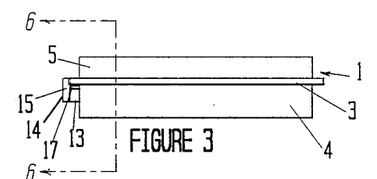
FIG. 3 is an elevational view of another version of the closure.

In another embodiment, shown in FIGS. 3 and 6, it is desirable to remove completely the portion of the closure below the score line 10. In this version, the lower score line 24 is not present. Additionally, a short vertical score line 21 extends downwardly from the tear tab to the bottom edge of skirt 4, to permit complete removal of the lower portion of the closure.

Figure 7:
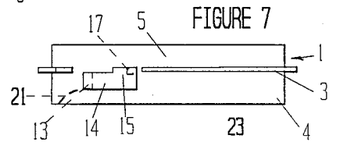
FIG. 7 is an elevational view of another version of the closure.

As shown in FIG. 7, the score line 21 can also be helical and extend along the inside wall of the closure. This avoids a vertical weakened line which could split during application of the closure to a bottle. When the tear tab 14 is pulled, it will thus completely separate the reclosure portion 5 from the lower portion 23 of the closure. As the lower portion is also torn along score line 21, it will be completely separated from the bottle neck.

Figure 6:
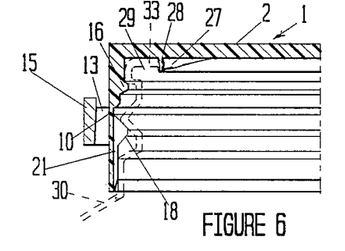
FIG. 6 is an enlarged sectional view along line 6—6' of FIG. 3.

Referring to FIGS. 5 and 6, the closure has a downwardly dependent corking skirt 28 on the undersurface of the top disk 2. This corking skirt 28 is concentric with, and located within, the peripheral skirt 4, and is spaced apart therefrom by an annulus 29 of limited dimension as described hereinafter. The corking skirt 28 is formed with a wall of substantially lesser thickness than the peripheral skirt 4 or the top disk 2 to provide flexibility of this skirt to elastic deformation when placed on the neck 30 of a bottle. Triangular gussets 27 can be provided about the inner peripheral wall of the corking skirt 28 and these gussets lie along radials of the top disc 2. The gussets provide resiliency and reinforcement to the corking skirt and, preferably, are also formed of very limited thickness so as to have a capability of flexing in the manner described hereinafter.

The bottle neck 30, shown in broken lines, has annular grooves 32 and 34, which receive the beads 16 and 18 of the closure. The mouth of the bottle is encircled by an annular lip 33 which fits into the annulus 29 and seats against corking skirt 28. The corking skirt engages the lip 33 in a resilient seal, and for this purpose, the width of the annulus 29 is slightly less than the width of the lip 33, insuring resilient deformation of the corking skirt 28 when the closure is placed on the bottle neck.

Figure 8:
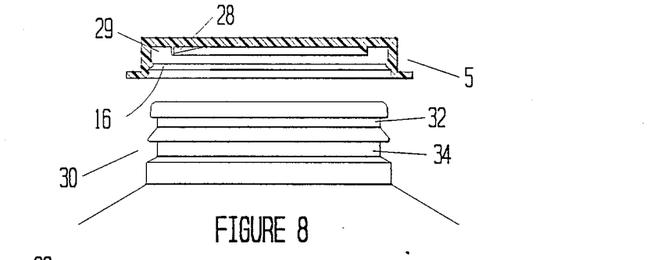
FIG. 8 is a sectional view of the reclosure formed from the closure in exploded view relative to the neck of a bottle.
Figure 9:
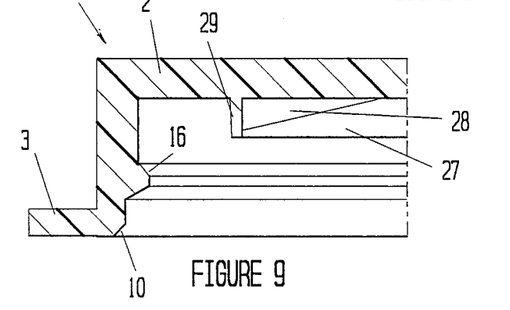
FIG. 9 is a partial, enlarged sectional view of the reclosure of FIG. 8.

FIG. 8 shows the bottle neck 30 with tear band 20 and upper closure portion 5 removed. The lower portion 7 of skirt 4 remains about the bottle neck. The neck finish includes annular grooves 32 and 34 which receive, respectively, beads 16 and 18 of closure 1. The neck finish of the bottle comprises a cylindrical wall having a plurality of V-grooves, preferably two which are spaced apart by a distance corresponding to the vertical distance between the upper and lower beads on the inner side wall of the peripheral skirt. The upper groove thus is a seat for the upper bead of the reclosure to lock the reclosure to the neck. The lower groove, of course, receives the lower bead shown in FIG. 6, when the closure is pressed over the neck at the bottling operation.

Bead 16 is in the inside wall of upper reclosure 5, and functions by reseating in groove 32 of bottle neck 30. The upper bead 16 is disposed above score line 10, between score line 10 and the undersurface of disk 2. With the closure of FIG. 5, the lower circumferential bead 18 is disposed below the second score line 24. The beads 16 and 18 are substantially uniform raised surfaces projecting inwardly from the skirt. The beads may be continuous about the entire periphery of the inner wall of skirt 4 or, alternatively, may be discontinuous. The cross-sections of the beads can be semi-circular, however, they are preferably triangular with inclined sidewalls, as shown in FIGS. 5 and 6. The triangularity of these beads is preferred for ease in capping, removal and re-application of the closure since the inclined surfaces of the triangular cross-sectional beads transmit axial force applied to the closure in an outward, radial direction thereby urging the grooves to seat or unseat from the grooves in the neck finish of the container. The inclined sidewalls also facilitate manufacture in ease of ejection of the closures from the molds used to fabricate the closures.

The reclosure 5, as previously mentioned, is formed by pulling tear tab 14 which removes the upper portion above the upper groove from the remainder of the closure. This leaves a reclosure 5 having the top disk 2, the upper portion of the peripheral skirt 4 that includes the upper annular bead 16 on its inside wall that is directly opposite the discontinuous annular lip 3. The corking skirt 28 extends downward to a level immediately above the bead 16.

Figure 10:
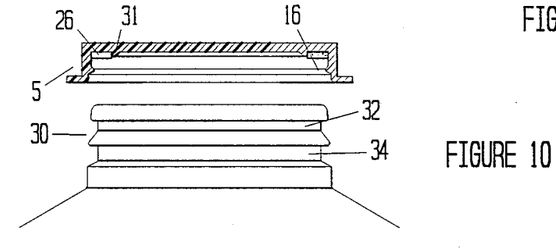
FIG. 10 is a sectional view of a reclosure formed from a closure which has a sealing liner, shown relative to the neck of a bottle.
Figure 11:
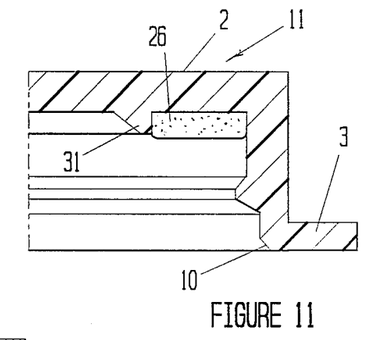
FIG. 11 is a partial, enlarged sectional view of the reclosure of FIG. 10.

One of the advantages of this closure is that variations of the closure can be produced with the same mold cavities, only by replacing the cores of the mold. One variation is to substitute a sealing liner for the corking skirt. Referring now to FIGS. 10 and 11, there is illustrated an alternative embodiment of the invention wherein the center corking skirt is replaced with a sealing liner. The remainder of the closure is otherwise identical to the closure previously described. Received within the closure 11 is a compressible gasket 26 which is formed of suitable compressible plastic such as polyethylene, polyurethane, polystyrene, etc. A suitable material is a thermoplastic hot meld having a high elasticity. An example of a commercially available material is product S-314-434A from Bostik which has about 520 percent elongation at break point and a tensile strength of about 140 psi. This material can be applied in a foamed or unfoamed state. Other plastic foams can be used and are preferably of low density, e.g., about 0.5 to about 2 pounds per cubic foot. The gasket 26 is relatively thin, e.g., from about 0.1 to about 0.25 inch, preferably from about 0.1 to about 0.125 inch in thickness. The gasket is formed of plastics which are resistant to liquid permeation, and when used in a foamed state, the foams are formed of closed cells, to be impermeable to liquids. The gasket 26 can be formed during the formation of the closure, and for this purpose, a polyolefin liquid resin, which cures to a polyolefin foam can be injected into the mold cavity as a preliminary step to the injection molding of the closures. Once the polyolefin foam is injected and the foam gasket 26 is formed, the injection molding of the closure proceeds with the formation of a closure having a firmly bonded gasket 26 on its undersurface. The gasket 26 can be subsequently formed or bonded to the undersurface of closure 26, either by bonding a preformed and precut gasket 26 or by applying the liquid plastic onto the previously formed closure. This is the preferred application with the hot melt gasket material previously described. Preferably, the undersurface of closure 1 has an annular, raised rim 31 about its periphery, to provide an annular recess which is filled by gasket 26, thus avoiding the application of the gasket material across the entire undersurface of closure 11.

When the closure is seated on the container with its beads 16 and 18 received within the annular grooves 32 and 34 of the neck finish, the container neck 30 compresses the gasket 26, which conforms to any variations or tolerances in the dimensions of the neck, thus insuring sealing of the contents of the container.

Figure 12:
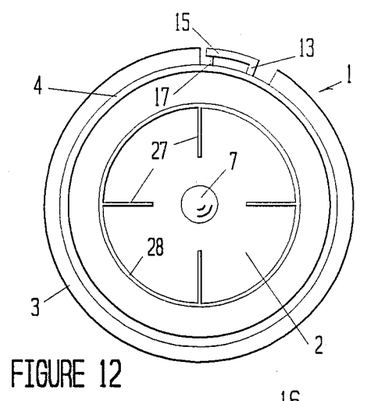
FIG. 12 is a view of the undersurface of the closure shown in FIGS. 6 and 7.
Figures 13, 14:
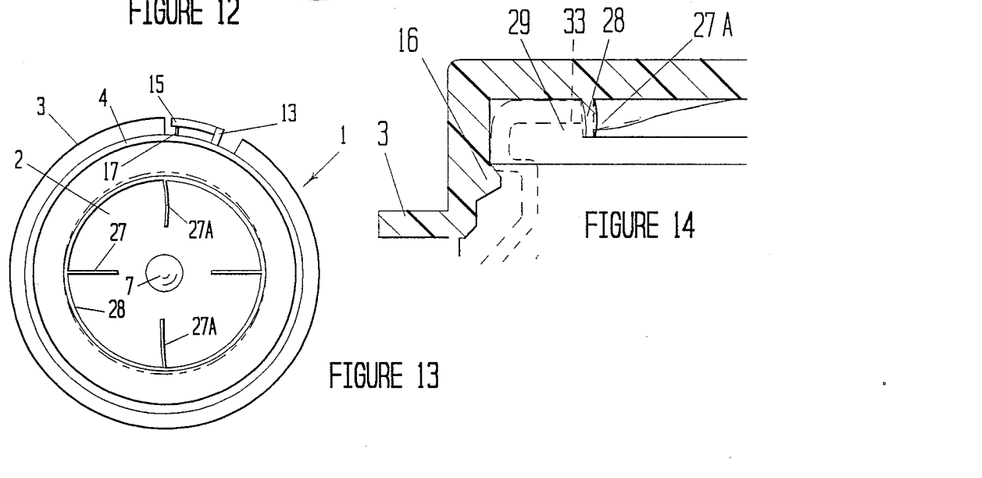
FIG. 13 is a view of the undersurface of the closure of FIG. 10, showing flexing of the center skirt.
FIG. 14 is enlarged sectional view of the cap, showing the flexing of the center skirt.

The center corking skirt of the embodiment shown in FIGS. 5 and 6 also has the ability to conform to variations or tolerances in the dimensions of the neck finish. FIGS. 12-14 illustrate this deformation capability. FIG. 12 is a view of the undersurface of the closure, as molded, and FIG. 13 is a view of the undersurface of the closure as it deforms to fit the mouth of a bottle. FIG. 14 is a sectional view through the cap with the bottle neck shown in broken lines. In FIGS. 13 and 14, the upper lip 33 (see FIG. 14) about the mouth of the bottle 30 has a slightly lesser internal diameter than the outer diameter of the corking skirt 28, thereby requiring deformation of the corking skirt 28 to permit its entry into the mouth of the bottle. This results in flexing of the corking skirt to a slightly elliptical shape from the circular shape, which is shown by the broken lines in FIGS. 13 and 14. This flexing can occur as the corking skirt 28 is sufficiently thin to provide flexibility and the triangular gussets 27 are also sufficiently thin to flex. This is shown by gussets 27A of FIGS. 13 and 14 which have flexed to permit an inward deflection of the corking skirt 28, thereby providing a tight seal about the inner lip 33 of the neck finish. The undersurface of the closure 1 has a small central protrusion 7, which receives the initial portion of the plastic injected during the molding operation. In most injection molding operations, a small slug of cooled and partially solidified plastic is formed at the injection gate. A circular depression in the mold core receives this slug and prevents interruptions in the molding operation, resulting in the formation of protrusion 7 on the undersurface of the molded closure.

Figure 15:
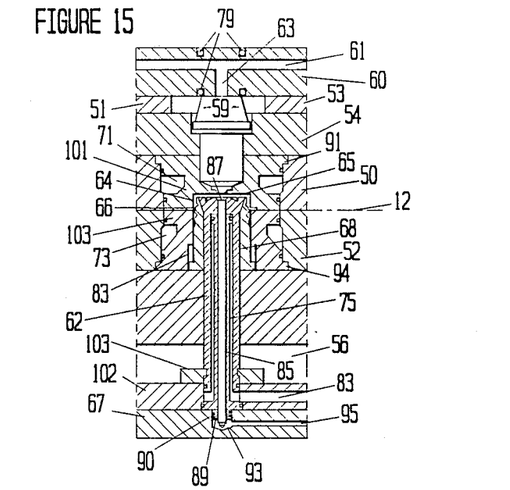
FIG. 15 an elevational sectional view through a cavity of a mold to manufacture the closures.
Figure 16:
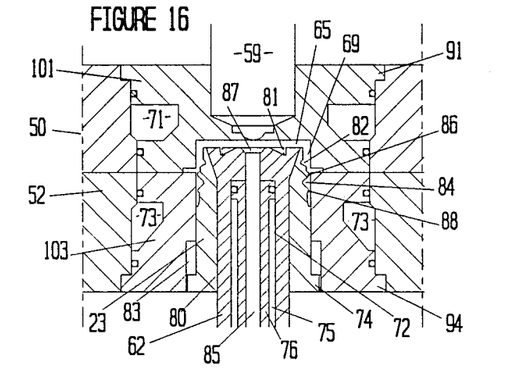
FIG. 16 is an enlarged sectional view of the mold cavity members of FIG. 15.

Referring now to FIGS. 15 and 16, the mold and its operation for the production of the closures of this invention will be described. FIG. 15 is an elevational sectional view through one cavity of a multi-cavity mold, and FIG. 16 is an enlargement of the mold cavity members of the mold. The closures are preferably made by injection molding and the mold described hereinafter is intended for this manufacturing method. As illustrated in FIGURE 15, the preferred mold has a plurality of plates which house mold cavities for the closures.

The parting line for the mold is line 12 which lies along the bottom surface of the lip 3 (see FIG. 2) of the closure. The center die plate 50 receives the mold insert 101 which is retained therein by an annular shoulder 91. The mold insert 101 has a cylindrical recess 64 and a surrounding annular recess 66. The cylindrical recess 64 corresponds in depth to the height of the reclosure 5 and the annular groove 66 corresponds in width and thickness to the lip 3 of the closure. This recess is coaxial with a cylindrical bore 68 in the opposite mold insert 103 which is received in die plate 52 and secured therein by an annular shoulder 94. The bore 68 has a depth corresponding to the width of the skirt 4 of the closure beneath its lip 3.

A movable core 62 and surrounding core sleeve 23 are slidably received in bore 68. As shown in FIG. 16, core 62 extends into cylindrical recess 64, terminating short of the top of the recess, thereby forming a flat circular cavity 65, which forms the top disc 1 of the closure. The diameter of core 62 is also less than the diameter of the recess 64 and of cylindrical bore 68, to provide a cylindrical cavity 69 to form the skirt 4 of the closure. This cavity 69 is contiguous to flat cavity 65.

Core 62, at preselected locations, is provided with upper annular groove 82 and lower annular groove 84. These grooves form the annular beads 16 and 18, respectively, of closure 1. These grooves can be discontinuous to provide discontinuous beads about the periphery of inside wall of closure 1 or can be continuous, as desired.

As previously mentioned, score lines are molded into the closure to provide an annular tear band. These are provided by the annular beads 86 and 88 which are located on core 62, between the upper annular groove 82 and lower annular groove 84. These beads 86 and 88 extend into the annular cavity 69 between the core 62 and bore 68 of the outer mold plate 52. Location of the score lines on the inside wall of the closure 1 avoids the need to use molds which split in a plane axial to the cavity.

Molten polymer is injected into the mold through a distributor 60 which has a conventional hot gate 59 that controls the injection of the polymer. The molten polymer is supplied through internal passages 61 and 63 of the distributor 60. The polymer is maintained at desired temperatures by electrical heaters 79 in distributor 60 and similar heaters (not shown) in hot gate 59. The upper end of hot gate 59 is surrounded by spacer blocks 53 and 51. The polymer is injected into cavity 65 and flows downwardly filling cavity 69. Polymer flow into the cavity is controlled by the hot gate 59 which is operative to open and close at preselected times during the molding cycle.

The mold is provided with annular cavities 71 and 73 in plates 50 and 52, respectively, which surround the mold cavities. Cooling water is circulated through these cavities to control the mold temperature, and permit the polymer to solidify within cavities 65 and 69.

The core assembly housed in core sleeve 23 is slidably received in bore 72. Core sleeve 23 has a distal annular shoulder 74 and the limit of travel of the core sleeve 23 is set by the depth of counter bore 83 which receives the shoulder 74.

As shown in FIG. 16, core 62 has a central, longitudinal bore 72 which receives the inner core sleeve 76. Sleeve 76 is of lesser diameter than bore 72, forming annulus 75 which receives cooling water through passage 83 in plate 102 (see FIG. 15). Core 62 is secured to plate 102 with block 103. As shown in FIG. 15, the space 56 above block 103 is open to permit relative movement of the core assembly.

A rod 85 is slidably received in sleeve 76 and has a tapered head 87. The opposite end of rod 85 is received in chamber 93 of plate 66 (see FIG. 15). The rod 85 has a distal spring retainer 89 capturing a compression spring 90 beneath the lower end of sleeve 82. Compressed air is supplied to chamber 93 through passage 95 and serves during ejection to lift rod 85 sufficiently to permit air to lift the molded closure from the end of core 62.

Figure 17:
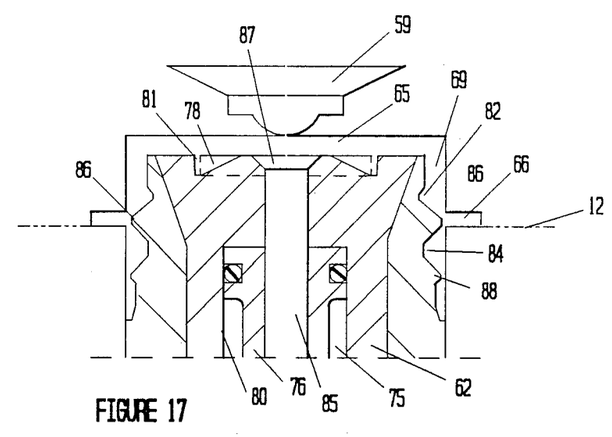
FIG. 17 is an enlarged sectional view of the mold cavity of FIGS. 15 and 16.
Figure 18:
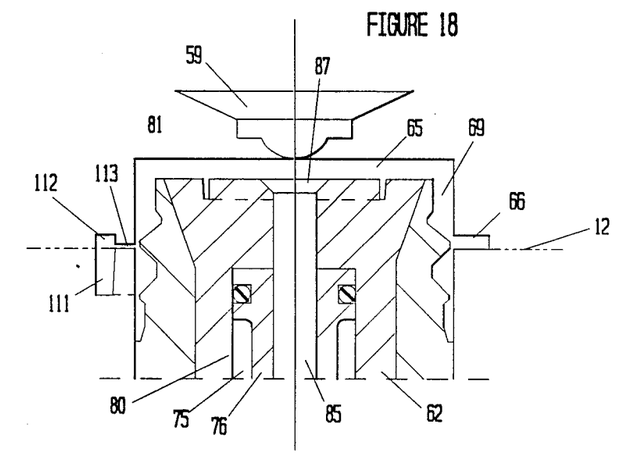
FIG. 18 is an enlarged sectional view of the mold cavity of FIGS. 15 and 16 through the tear tab cavity.

The mold cavities are shown in greater detail in FIGS. 17 and 18. The upper end of the core 62 has an annular recess 81 which forms the corking skirt 28, and a plurality of thin triangular, radial slits 78 which form the gussets 29. The sectional view of FIG. 17 is taken across the mold through both sides of annular cavity 66 that forms lip 3 of the closure.

FIG. 18 is a sectional view through the lateral cavities that form the tear tab. These cavities include a short arcuate cavity 111 that forms the lateral leg 15 of the tear tab which is contiguous with a radial cavity 115 which forms the radial leg 13 of the tear tab. The mold parting line 12 separates the cavity 111 into a lower cavity and an upper cavity 112. Also, a very small, radial cavity 113 extends between cavity 112 and 69 to form the attachment leg 17 which extends between the end of the tear tab 14 and the skirt 4.

In operation the outer cavity plates 52 are pressed against the opposite faces of the stationary mold plate 50 and the cores 62 are fully advanced into the outer mold plates 52 by compression of the core plates 56. The plates 60 are located at their position shown in FIG. 15 with their end surfaces flush with the surrounding ends of cores 62. The mold plate 50 which has been preheated with suitable heating means such as electrical conductors and the like is supplied with molten molding resin such as low density polyethylene through a supply conduit, not shown. Passageways internal of the mold plate 52 communicate with the mold feeder passageways 76 to supply the molding resin at a high pressure, e.g., 2000 to about 3500 psi., into the mold cavity. The molding resin is injected into the mold cavity by retraction of the valve member 80. When the cavity is filled, valve member 80 closes. The mold plates 50 and 52 are cooled sufficiently about the mold cavity by heat exchange with a cooling fluid so that the molten plastic gels after it is injected into the mold cavity. For this purpose, plates 50 and 52 have internal passageways, not shown, for circulation of a heat exchange fluid. Once the plastic within mold cavity 65 gels and begins to solidify, the plates 52, 56 and 58 are retracted from stationary plate 50. The outer cavity plate 52 is also retracted from its position relative to core 62, leaving formed closures on the ends of each of the cores 62. Once the outer cavity plate 52 has cleared the lower ends of the closures formed on the cores 62, the runners 60 are moved forward, past the ends of the cores 62, lifting the formed closures from their cores 62. Although the invention has been illustrated with reference to mechanically actuated runners 60 for ejection of the molded closures, this function can equally be accomplished by discharging a compressed fluid such as compressed air through valve passageways in cores 62 when it is desired to eject these closures.

The closures of the invention are thus capable of manufacture without the use of split-cavity molds, i.e., cavities split along the longitudinal axis of the mold cavity. The closures, however, are provided with annular lips 3 and immediately subjacent tear bands 20 having dependent, laterally projecting tear tabs 14. The tear tabs preferably have a greater width than the annular tear bands to provide a sufficient surface for grasping by the user, and this construction provides for a minimal width of the tear band 12. The closure of this design thus provides reclosure closures 5 and annular skirts 4 of maximum height. Since the annular lips 3 are located substantially across from the inner beads 16 of the reclosure closure, these lips are at their most effective position for removal of the closure with the application of an upward pressure. Additionally, the location of the annular lips at this position permits the tear tabs 14 to be tacked to the lips at their trailing end, a construction which insures that the closures will feed smoothly through closure chutes and conveyors of the capping machine.

The invention has been described to the illustrated and presently preferred embodiments. It is not intended that the invention be unduly limited by this disclosure of preferred embodiments. Instead, it is intended that the invention be defined by the means, and their obvious equivalents, set forth in the following claims.

What is claimed is:

1. In a snap on closure for a bottle having a neck finish which includes an inwardly directed lip about its upper edge, said closure having a top disc with a downwardly dependent cylindrical peripheral skirt, at least one annular bead on the inner wall of said skirt which resiliently seats in a mating annular groove about the neck of said bottle, the improvement comprising:

an inner corking skirt formed by an annular cylindrical wall also downwardly dependent from the undersurface of said disc and concentric within said peripheral skirt and inwardly spaced therefrom by an annulus of a width slightly less than the annular width of said inwardly directed lip of said bottle, said sidewall of said corking skirt having a significantly lesser thickness than said peripheral skirt and being sufficiently thin to permit its inward deflection by said lip of the neck of said bottle without causing said bead to dislodge from said annular groove of said neck.

2. The snap on closure of claim 1 including a plurality of radial reinforcement gussets dependent on the undersurface of said disc and extending radially inwardly from the inner surface of said inner corking skirt.

3. The snap on closure of claim 2 wherein said gussets are sufficiently thin to permit flexing along their length, thereby permitting radial deformation of said inner corking skirt.

4. The snap on closure of claim 1 wherein said inner corking skirt extends downwardly below said inwardly extending lip.

5. The snap on closure of claim 1 including at least two annular beads on the inside wall of said peripheral skirt.

6. The snap on closure of claim 5 wherein said peripheral skirt has at least one annular groove in its wall and located between said two annular beads, reducing its thickness to provide a tear line.

7. The snap on closure of claim 6 including two annular grooves in the wall of said peripheral skirt to provide an annular tear band in said skirt.

8. The snap on closure of claim 1 including a lateral tab on the outside of said peripheral skirt and attached thereto at a location on said tear band, to thereby function as a tear tab.

9. In a snap on closure for a bottle having a neck finish of a first annular thickness, said closure having a top disc with a downwardly dependent cylindrical peripheral skirt, at least one annular bead on the inner wall of said skirt the improvement comprising:

a. an inner corking skirt formed by an annular cylindrical wall also downwardly dependent from the undersurface of said disc and concentric within said peripheral skirt and inwardly spaced therefrom by an annulus of a width slightly less than said first annular thickness, said sidewall of said corking skirt having a significantly lesser thickness than said peripheral skirt and being sufficiently thin to permit its inward deflection by said bottle finish; and b. a plurality of radial reinforcement gussets dependent on the undersurface of said disc and extending radially inwardly from the inner surface of said inner corking skirt, said gussets being sufficiently thin to permit flexing along their length, thereby permitting radial deformation of said inner corking skirt.

10. The snap on closure of claim 9 including at least two annular beads on the inside wall of said peripheral skirt.

11. The snap on closure of claim 10 therein said peripheral skirt has at least one annular groove in its wall and located between said two annular beads, reducing its thickness to provide a tear line.

12. The snap on closure of claim 11 including two annular grooves in the wall of said peripheral skirt to provide an annular tear band in said skirt.

13. The snap on closure of claim 9 including a lateral tab on the outside of said peripheral skirt and attached thereto at a location on said tear band, to thereby function as a tear tab.

* * * * *